(12) United States Patent
Weyne

(10) Patent No.: US 10,194,591 B2
(45) Date of Patent: Feb. 5, 2019

(54) STUFFER UNIT FOR AN AGRICULTURAL BALER WITH AUTOMATIC DENSITY CONTROL

(71) Applicant: CNH Industrial America LLC, New Holland, PA (US)

(72) Inventor: Koen Weyne, Merkem (BE)

(73) Assignee: CNH Industrial America, LLC, New Holland, PA (US)

( * ) Notice: Subject to any disclaimer, the term of this patent is extended or adjusted under 35 U.S.C. 154(b) by 0 days.

(21) Appl. No.: 15/984,964

(22) Filed: May 21, 2018

(65) Prior Publication Data

US 2018/0263186 A1    Sep. 20, 2018

Related U.S. Application Data

(62) Division of application No. 14/755,574, filed on Jun. 30, 2015, now Pat. No. 10,004,177.

(30) Foreign Application Priority Data

Jun. 30, 2014 (BE) .................................. 2014/0502

(51) Int. Cl.
| | | |
|---|---|---|
| *A01F 15/04* | (2006.01) | |
| *A01F 15/10* | (2006.01) | |
| *A01D 89/00* | (2006.01) | |
| *A01D 78/04* | (2006.01) | |
| *A01D 57/12* | (2006.01) | |

(52) U.S. Cl.
CPC ............ *A01D 78/04* (2013.01); *A01D 57/12* (2013.01); *A01D 89/001* (2013.01); *A01F 15/042* (2013.01); *A01F 15/101* (2013.01); *A01F 2015/102* (2013.01)

(58) Field of Classification Search
CPC .................. A01F 15/101; A01F 15/042; A01F 2015/102; A01D 78/04; A01D 89/001; A01D 57/12
USPC ...................................................... 100/188 R
See application file for complete search history.

(56) References Cited

U.S. PATENT DOCUMENTS

| | | | |
|---|---|---|---|
| 2,884,850 | A | 5/1959 | Nolt |
| 2,893,491 | A | 7/1959 | Crowe |
| 4,106,268 | A | 8/1978 | White et al. |
| 4,569,282 | A | 2/1986 | Galant |
| 4,644,862 | A | 2/1987 | Young |
| 6,385,952 | B1 * | 5/2002 | Bergkamp ............ A01F 15/101 100/189 |
| 7,047,719 | B2 | 5/2006 | Dubois |
| 7,530,504 | B1 | 5/2009 | Danner et al. |
| 8,561,532 | B2 | 10/2013 | Bergmann |
| 8,683,779 | B2 | 4/2014 | Duenwald et al. |

(Continued)

FOREIGN PATENT DOCUMENTS

FR        1185953 A    8/1959

*Primary Examiner* — Jimmy T Nguyen
(74) *Attorney, Agent, or Firm* — Patrick M. Sheldrake; Peter K. Zacharias

(57) ABSTRACT

An agricultural baler includes a main bale chamber, a plunger reciprocally movable within the main bale chamber, and a stuffer unit including a tine arm defining an axis of rotation and a plurality of tines coupled with and extending from the tine arm. The tines are rotatable around the axis of rotation of the tine arm between a first position associated with a stuffing cycle and a second position associated with a loading cycle.

6 Claims, 5 Drawing Sheets

(56) References Cited

U.S. PATENT DOCUMENTS

| | | | |
|---|---|---|---|
| 9,010,241 B2 * | 4/2015 | Naaktgeboren | A01F 15/101 |
| | | | 100/142 |
| 10,004,177 B2 * | 6/2018 | Weyne | A01D 57/12 |
| 2003/0106299 A1 | 6/2003 | Vogt et al. | |
| 2014/0366752 A1 | 12/2014 | Naeyaert et al. | |

* cited by examiner

STUFFER UNIT FOR AN AGRICULTURAL BALER WITH AUTOMATIC DENSITY CONTROL

This application is a divisional of U.S. patent application Ser. No. 14/755,574, now U.S. Pat. No. 10,004,177 which also claims foreign priority under 35 U.S.C. § 119 to Belgian Application BE2014/0502 titled "STUFFER UNIT FOR AN AGRICULTURAL BALER WITH AUTOMATIC DENSITY CONTROL" and filed Jun. 30, 2014, the contents of which are incorporated herein by reference.

BACKGROUND OF THE INVENTION

1. Field of the Invention

The present invention relates to agricultural balers, and, more particularly, to stuffer units within such balers.

2. Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer tines which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

With a stuffer unit as described above, a tine arm is movable through a predetermined path as the stuffer unit transfers the wad of material from the pre-compression chamber to the main bale chamber. Typically the tines are mounted to the tine arm in a non-movable manner and the overall travel path of the tines is determined by the travel path of the tine arm.

U.S. Pat. No. 8,683,779 (Duenwald et al., assigned to Forage Innovations, BV) discloses a large square baler with a stuffer unit having a tine arm which can be moved along a track. The stuffer unit moves the tine arm along the same stuffing profile curve, but the position of the tines can be varied to change the effective stuffing profile curve.

What is needed in the art is an agricultural baler which provides an improved the density of the crop material in the pre-compression chamber during a stuffing cycle, prior to a loading cycle.

SUMMARY OF THE INVENTION

The present invention provides an agricultural baler with a stuffer unit having a tine arm with tines which can be fixed at a stuffing orientation during a loading mode, and allowed to trip with a spring loaded arrangement to a loading orientation during a stuffing mode.

The invention in one form is directed to an agricultural baler, including a main bale chamber, a plunger reciprocally movable within the main bale chamber, and a stuffer unit including a tine arm defining an axis of rotation and a plurality of tines coupled with and extending from the tine arm. The baler is characterized in that the tines are rotatable around the axis of rotation of the tine arm between a first position associated with a stuffing cycle and a second position associated with a loading cycle.

An advantage of the present invention is that bales can be formed with a higher density.

Another advantage is that the bales can be formed with an improved bale shape.

Yet another advantage is that the present invention provides more control over the density of the bale (for different types of crop materials).

A further advantage is that the present invention provides less peak load when driving the stuffer.

A still further advantage is that the stuffer unit can be operated with continuous cyclic movement.

Yet a further advantage is that there is no need for a stuffer brake or a one cycle clutch.

A still further advantage is that no complex steering or control unit is needed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
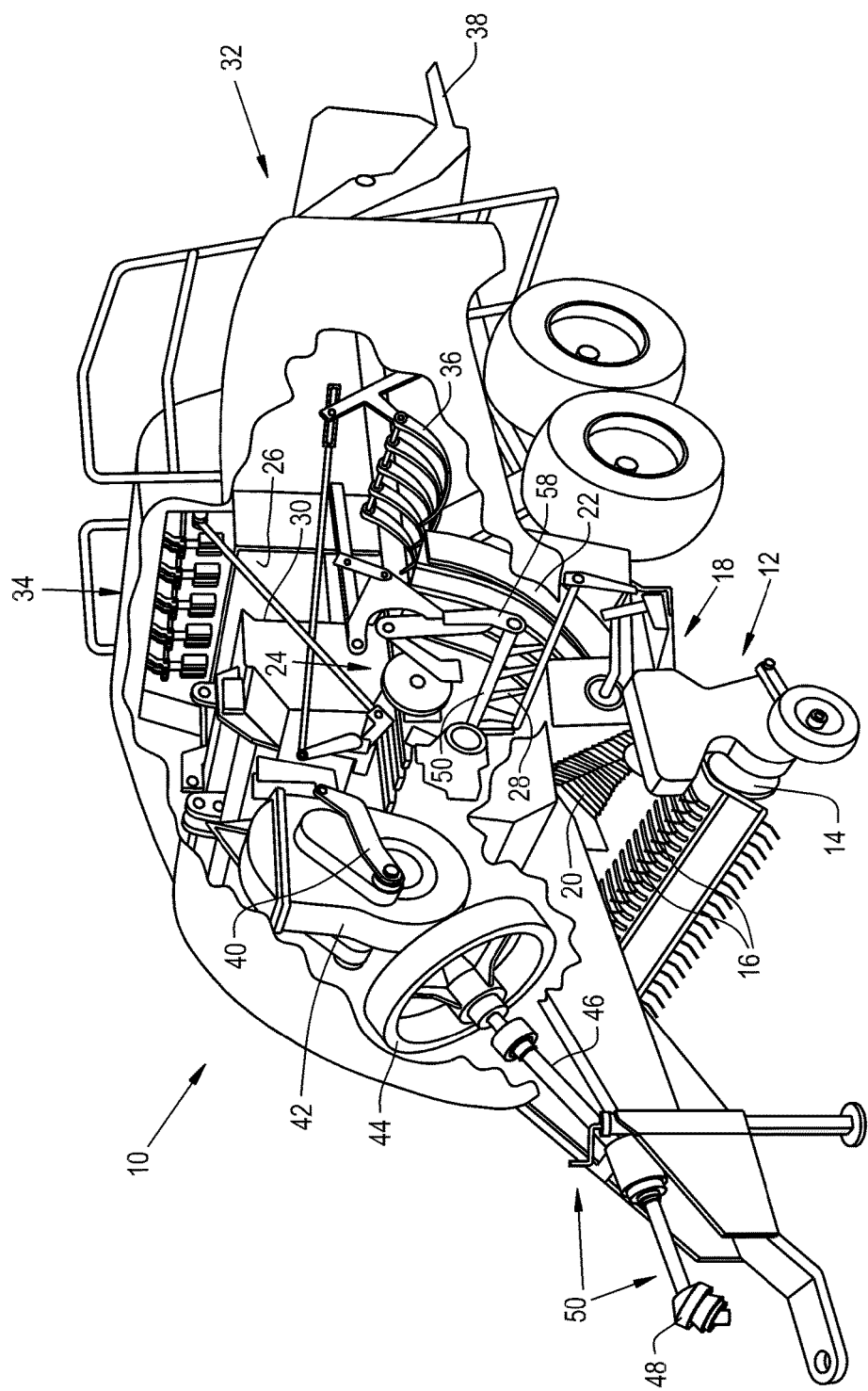
FIG. 1 is a perspective cutaway view showing the internal workings of a large square baler, which may include a stuffer unit with a tine arm of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer tines 28 which thrust the wad of crop directly in front of a plunger 30, which reciprocates within the main bale chamber 26 and compresses the wad of crop into a flake. Stuffer tines 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit.

Figure 2:
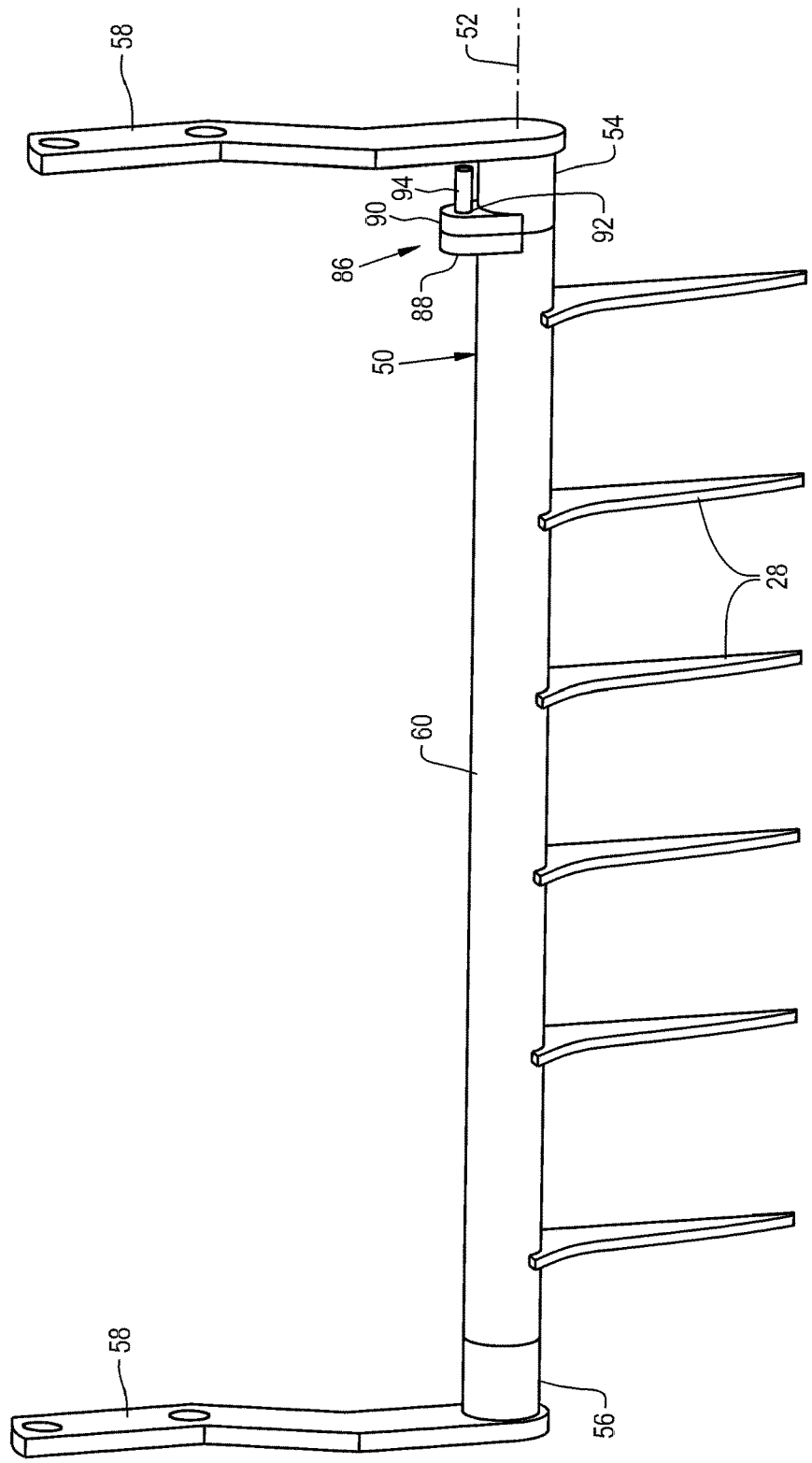
FIG. 2 is a perspective view of the tine arm which is part of the stuffer unit shown in FIG. 1.
Figure 3:
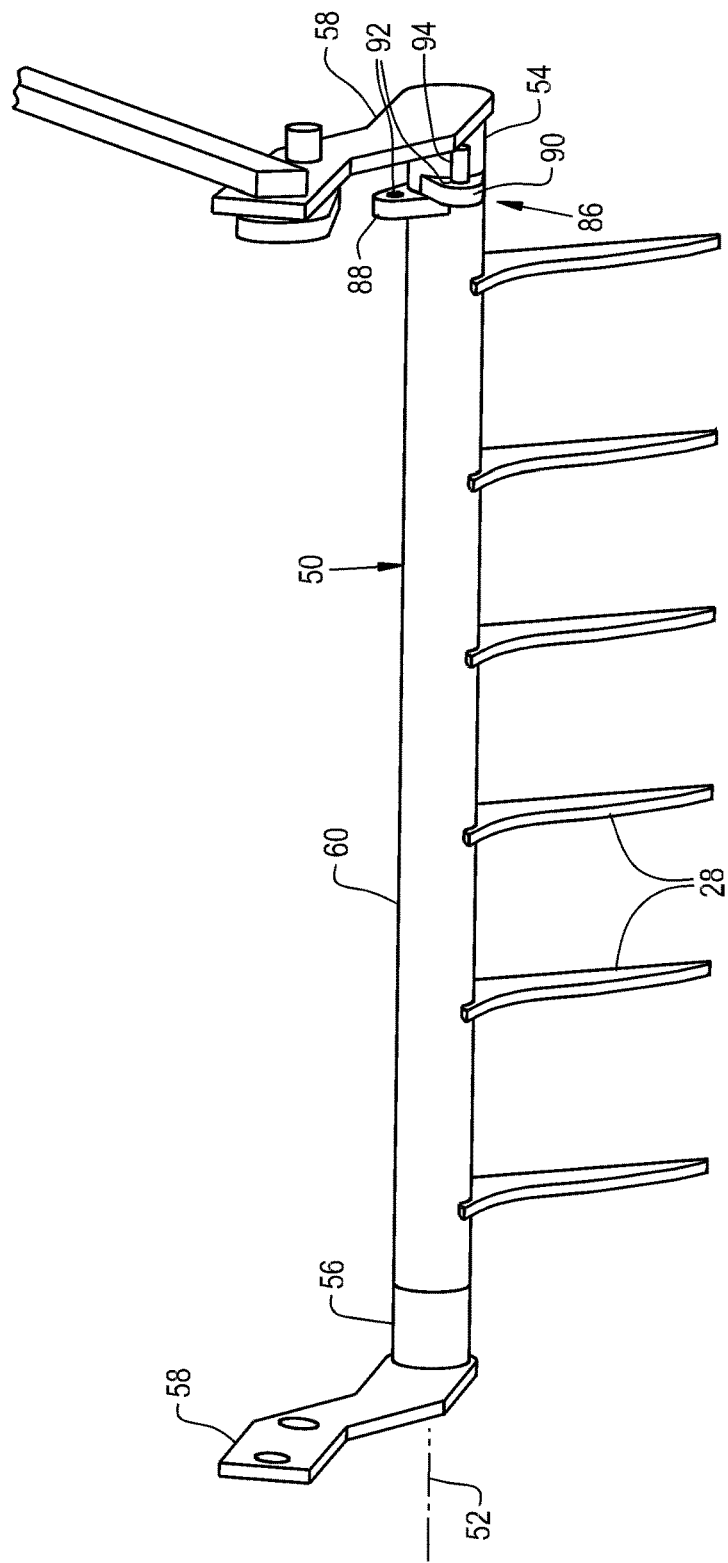
FIG. 3 is another perspective view of the tine arm shown in FIG. 2.
Figure 4:
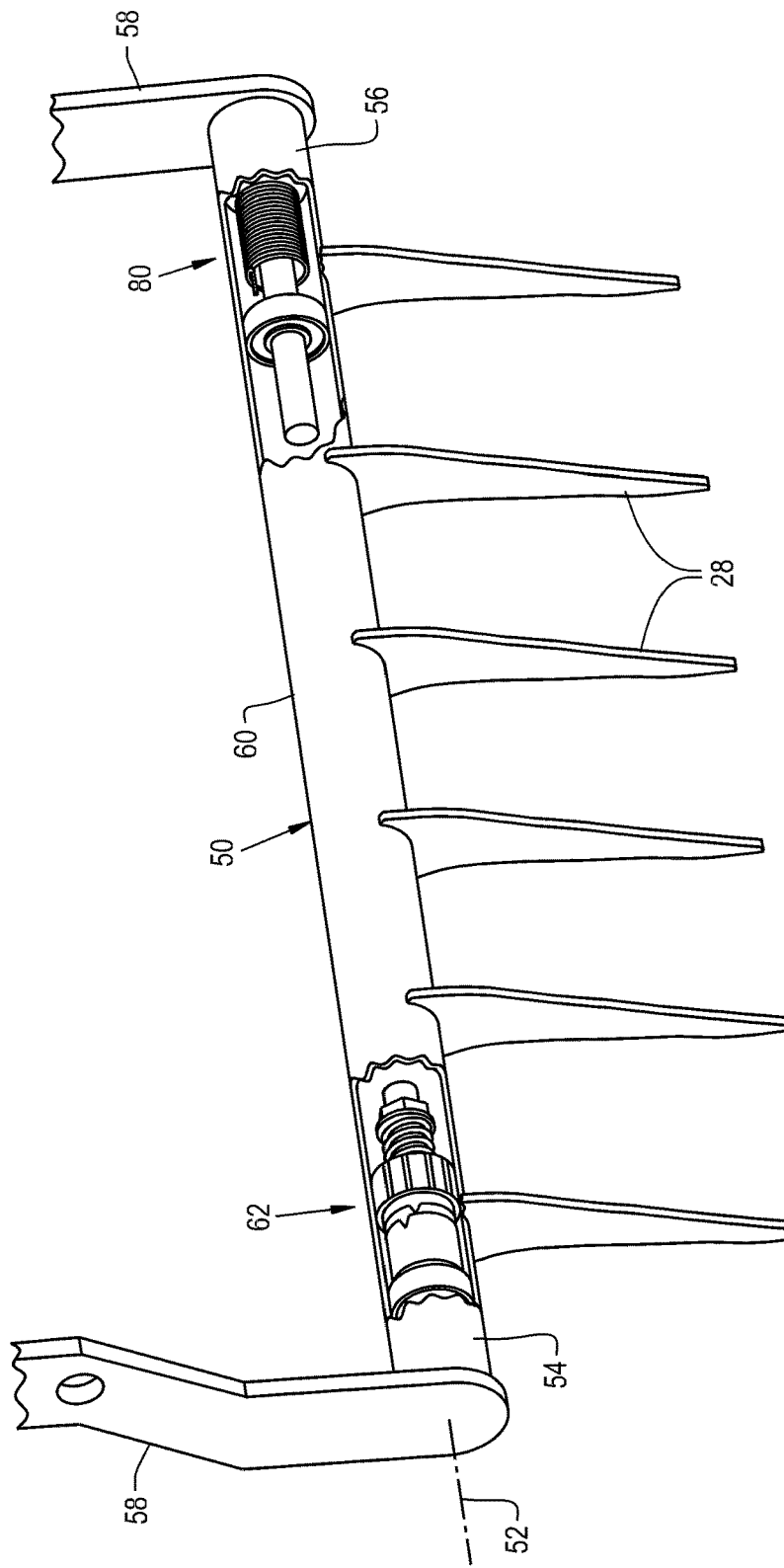
FIG. 4 is another perspective view of the tine arm shown in FIGS. 2 and 3, with part of the tine arm fragged out to show a clutch and return spring at the respective ends of the tine arm.

According to an aspect of the present invention, and referring now to FIGS. 2-4, the stuffer unit 24 is configured for movement through a continuous stuffing cycle for compressing crop in the pre-compression chamber 22, and the tines 28 are movable between a first position associated with a loading cycle and a second position associated with a stuffing cycle during each stuffing cycle. More particularly, the stuffer unit 24 includes a tine arm 50 which defines an axis of rotation 52. The tine arm 50 includes a pair of stub arms 54 and 56, with each stub arm being located at a respective longitudinal end of the tine arm 50. Each stub arm 54 and 56 is rigidly coupled with a respective stuffer arm 58. The tine arm 50 also includes a hollow tube 60 extending between and rotatable relative to the stub arms 54 and 56. The stuffer tines 28 are mounted to the hollow tube 60 and rotate about the axis of rotation 52 with the hollow tube 60.

Tine arm 50 is configured such that the tines 28 are biased to and selectively locked in position at the first position associated with the loading cycle so that a wad of crop material can be transferred from the pre-compression chamber 22 to the main bale chamber 26 during a loading cycle. Additionally, the tines 28 can be tripped from the biased first position for movement to the second position during one or more stuffing cycles so that the crop material can be pre-compressed within the pre-compression chamber 22. The tines 28 are allowed to trip and move to the second position during the repetitive stuffing cycles, otherwise the tines 28 are oriented to move the entire wad of crop material from the pre-compression chamber 22 into the main bale chamber 26. It is to be understood that as the crop material accumulates within the pre-compression chamber 22, the degree to which the tines 28 will rotate varies and thus the second position (defined as the fully rotated position) will likewise vary from one stuffing cycle to another.

Figure 5:
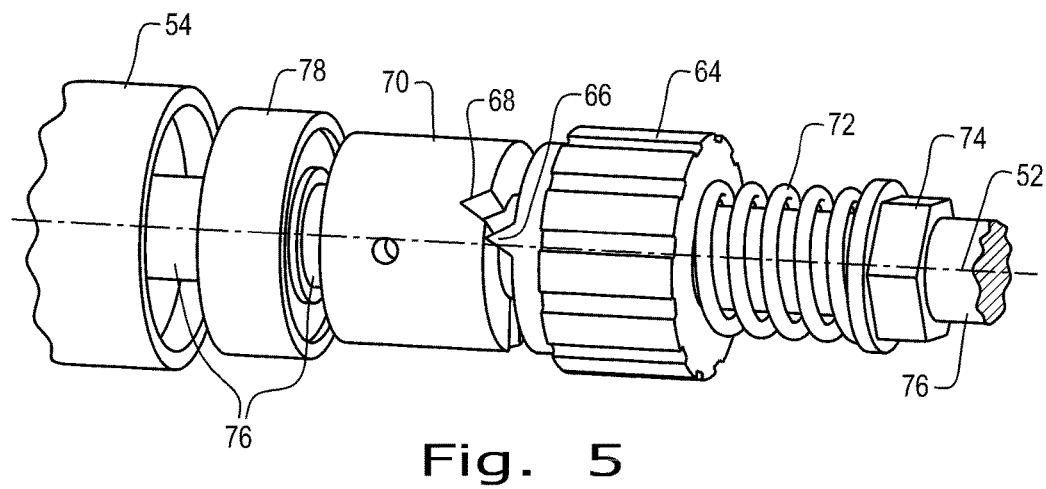
FIG. 5 is a perspective view of the clutch shown in FIG. 4.
Figure 6:
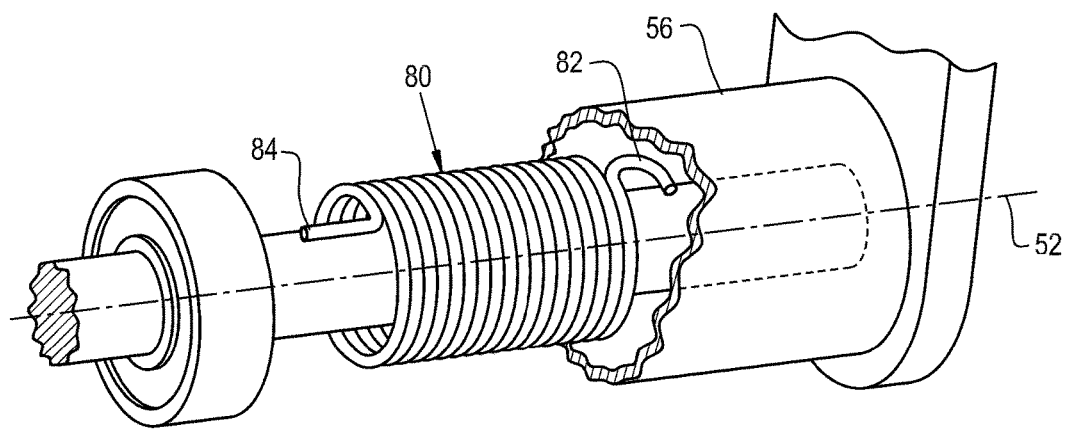
FIG. 6 is a perspective view of the return spring shown in FIG. 4.

Referring now to FIGS. 4-6, conjunctively, the tine arm 50 includes a clutch 62 which allows the tines 28 to be tripped from the first position for movement to the second position during a stuffing cycle. The clutch 62 is configured as an overload clutch which is positioned within the hollow tube 60 and interconnects the hollow tube 60 with the stub arm 54. The clutch 62 includes a first collar 64 with one or more axially projecting teeth 66 which engage with corresponding recesses 68 formed in a second collar 70. A compression spring 72 biases the first collar 64 into the second collar 70. The mechanical preload between the first collar 64 and the second collar 70 can be adjusted using a nut 74 which is threaded onto rod 76. Adjusting the preload, and thus the point at which the clutch 62 trips or disengages, in turn allows the density of a specific crop to be varied, or adjusted from one crop to another. The outside diameter of rod 76 is pressed into an inner race of a bearing 78, and the outer race of the bearing 78 is pressed into or otherwise affixed to the inside diameter of the hollow tube 60. The rod 76 is also rigidly coupled with the end of stub arm 54, and the bearing 78 allows the hollow tube 60 to rotate relative to the stub arm 54.

The tine arm 50 also includes a return spring 80 for biasing the tines 28 to the first position associated with the loading cycle. The return spring 80 is positioned within the hollow tube 60 and interconnects the hollow tube 60 with the stub arm 56. In the illustrated embodiment, the return spring 80 is configured as a rotary coil spring with one end 82 which is coupled with the stub arm 56 and an opposite end 84 which is coupled with the hollow tube 60 in any convenient manner (not specifically shown). A rod 76 is rigidly coupled with the stub arm 56 and the inner race of a bearing 78 is press fit onto the rod 76. The outer race of the bearing 78 is press fit into or otherwise affixed to the inside diameter of the hollow tube 60, and the bearing 78 allows rotation of the hollow tube 60 relative to the stub arm 56.

Referring again to FIGS. 2 and 3, the tine arm 50 also includes a lock 86 which locks the rotation of the hollow tube 60 relative to the stub arms 54 and 56 during a loading cycle when a wad of crop material is transferred from the pre-compression chamber 22 to the main bale chamber 26. The lock 86 includes a first ear 88 which is coupled with and extends radially from the hollow tube 60, and a second ear 90 which is coupled with and extends radially from the adjacent stub arm 56. Ears 88 and 90 include respective holes 92 which align with each other when the tines 28 are in the first position corresponding to a loading cycle. A pin 94 is placed through the aligned holes 92 using a suitable actuator, such as a hydraulic, pneumatic, electric or other actuator (not shown). FIG. 2 illustrates the ears 88 and 90 in an aligned position and a pin 94 ready for insertion into the aligned holes 92. FIG. 3 illustrates the hollow tube 60 after being tripped and rotated to the second position such that the ears 88 and 90 do not align with each other. It will be appreciated that other types of locking arrangements can also be used.

During operation of the baler 10, the plunger 30 reciprocates back and forth during compression cycles within the main bale chamber 26. The plunger 30 is coupled with the stuffer unit 24 and the stuffer unit is operated in coordination with movement of the plunger 30. Rather than only intermittently operating the stuffer unit 24 and using a brake to stop the movement of the stuffer unit 24, the stuffer unit can be continuously operated through stuffing cycles to pre-compress the crop material within the pre-compression chamber 22, and then selectively operated in a loading cycle to transfer the wad of crop material from the pre-compression chamber 22 to the main bale chamber 26.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tine arm for use in a stuffer unit of an agricultural baler, comprising:
    a pair of stub arms with each stub arm at a respective longitudinal end of the tine arm;
    a hollow tube extending between and rotatable relative to the stub arms,
    a plurality of tines coupled with and extending from the hollow tube; and
    a clutch positioned within the hollow tube adjacent one of the stub arms, wherein the clutch is operable to allow the tines to rotate around an axis of rotation of the tine arm between a first position associated with a loading cycle and a second position associated with a stuffing cycle, and wherein the clutch is configured to allow the tines to be tripped from the first position for movement to the second position during the stuffing cycle.

2. The tine arm of claim 1, further including a return spring positioned within the hollow tube adjacent an other of the stub arms.

3. The tine arm of claim 2, wherein the clutch interconnects between the hollow tube and the one stub arm, and the return spring interconnects between the hollow tube and the other stub arm.

4. The agricultural baler of claim 2, wherein the clutch is a spring loaded tooth-engaging clutch, and the return spring is a rotary coil spring.

5. The tine arm of claim 2, wherein the return spring biases the tines to the first position associated with the loading cycle.

6. The tine arm of claim 1, further including a lock for selectively locking rotation of the hollow tube relative to the stub arms when the tines are in the first position.

* * * * *